United States Patent [19]

Oettinger et al.

[11] 4,306,869
[45] Dec. 22, 1981

[54] EDUCATIONAL AID FOR CLASSROOM USE

[75] Inventors: Ruth R. Oettinger, 525 N. Fifth St., Albemarle, N.C. 28001; David W. Allred, Huntersville, N.C.

[73] Assignee: Ruth R. Oettinger, Albermarle, N.C.

[21] Appl. No.: 93,886

[22] Filed: Nov. 13, 1979

[51] Int. Cl.³ .............................................. G09B 19/14
[52] U.S. Cl. ..................................... 434/305; 434/430
[58] Field of Search .................. 35/1, 8 R, 23 R, 7 A; 116/63 P; 434/305, 238, 245, 430

[56] References Cited

U.S. PATENT DOCUMENTS

| | | | |
|---|---|---|---|
| 2,854,765 | 10/1958 | Rickless | 35/35 H |
| 2,965,978 | 12/1960 | Olson | 434/238 |
| 3,206,744 | 9/1965 | Nelson | 116/63 P X |
| 3,304,627 | 2/1967 | Cella | 35/8 R |
| 3,514,873 | 6/1970 | Stobbe | 35/7 A X |
| 3,685,170 | 8/1972 | Fairleigh | 35/7 A X |
| 3,769,720 | 11/1973 | Terrones | 35/7 A |

FOREIGN PATENT DOCUMENTS

| | | | |
|---|---|---|---|
| 1183923 | 2/1959 | France | 434/430 |
| 684172 | 12/1952 | United Kingdom | 116/63 P |

Primary Examiner—William H. Grieb
Attorney, Agent, or Firm—Bell, Seltzer, Park & Gibson

[57] ABSTRACT

An educational aid is provided which is adapted for classroom control and instructional use. The aid comprises a generally rectangular flat support panel, and a pocket mounted at one end of the support panel and having an opening which faces the other end. Three discs, which are respectively colored red, yellow and green, are adapted to be magnetically secured to that portion of the panel to simulate a traffic light, and any of the discs which are in non-use may be retained in the pocket. The aid is adapted for classroom control of young students by permitting various discs to be displayed to indicate permissible or non-permissible activities. Also, the aid may be used to instruct the students as to the meaning of the various signals of a conventional traffic light.

6 Claims, 4 Drawing Figures

EDUCATIONAL AID FOR CLASSROOM USE

The present invention relates to an educational aid adapted to provide visual signals to students in a classroom for classroom control, educational purposes, or the like.

Young students often respond positively to teaching aids which have the characteristics of a game. With this in mind, it is an object of the present invention to provide an educational aid which is able to hold the attention of young students and thereby accomplish its intended educational purpose, by reason of its unique and interesting method of use and physical characteristics.

It is a more particular object of the present invention to provide an educational aid adapted for classroom control of young students, by permitting various signals to be displayed in the classroom to indicate permissible or non-permissible activities.

It is also an object of the present invention to provide an educational aid of the described type which is configured to simulate a traffic light, to thereby concurrently instruct the students as to the meaning of various signals of a traffic light.

It is still another object of the present invention to provide an educational aid of the described type which is of simple and lightweight construction, and which is sized to permit it to be readily used and carried.

These and other objects and advantages of the present invention are achieved in the embodiment illustrated herein by the provision of an educational aid which comprises a generally rectangular flat panel which includes a display surface portion, and a pocket mounted at one end of the panel so as not to overlie the display surface portion. A plurality of indicators are also provided, with each indicator being visually distinct from the other indicators and being of a size to render the same clearly visible throughout a classroom. The indicators may be releasably secured upon the display surface portion, and such that any one of the indicators may be mounted upon the display surface portion to give a desired signal to students, and with the remaining indicators being retained in the pocket.

In the preferred embodiment as illustrated herein, the apparatus is preferably disposed with the length dimension of the display surface portion extending vertically and with the pocket at the lower end thereof. Also, the indicators are in the form of three circular discs which are respectively colored green, yellow and red. Also, the display surface portion has a length (i.e., height) which is sufficient to accommodate the three discs positioned in a longitudinally aligned and spaced apart relationship, such that the apparatus simulates a traffic light.

Some of the objects having been stated, other objects will appear as the description proceeds, when taken in connection with the accompanying drawings in which.

Figure 1:
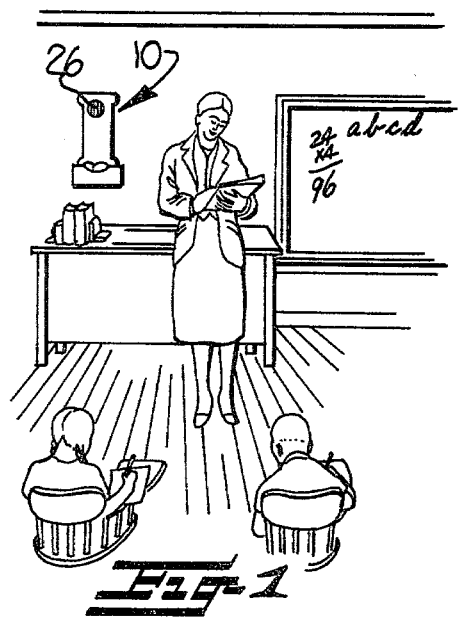
FIG. 1 is an environmental view illustrating an educational aid embodying the present invention as typically used in a classroom.

Referring more specifically to the drawings, an educational aid embodying the features of the present invention is illustrated generally at 10. The aid comprises a generally rectangular, flat support panel 12 which is preferably fabricated from a ferrous metal material for the purposes described below. Also, the panel 12 may be suitably painted or covered with fabric or plastic sheeting (not shown) to provide a pleasing appearance.

A box-like pocket 14 is mounted to overlie one end of the panel, and such that the portion of the support panel which extends beyond the pocket defines a display surface portion 15 which, in the illustrated embodiment, has a length equal to about three times its width. The pocket 14 comprises a flat sheet 16 secured in a parallel spaced relationship with respect to the support panel. More particularly, the sheet 16 is secured along the lower end edge and a portion of the opposing side edges of the support panel by suitable spacer panels 17, 18 and 19, respectively, to define an opening 20 which extends across the full width of the panel and faces the display surface portion 15. The sheet 16 further includes an arcuate cut-out 21 along the opening for the purposes described below.

The aid 10 further comprises three indicators in the form of circular discs 24, 25, 26 of substantially equal size. Each disc has a colored face which is visually distinct from that of the other discs. Preferably, the faces are respectively colored green, yellow, and red, such that the apparatus may be configured to simulate a traffic light as further described below.

Figure 2:
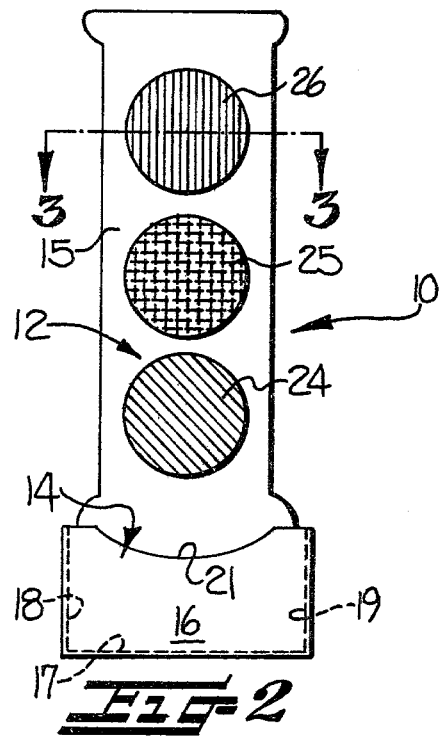
FIG. 2 is a front elevation view of the educational aid as shown in FIG. 1.
Figure 3:
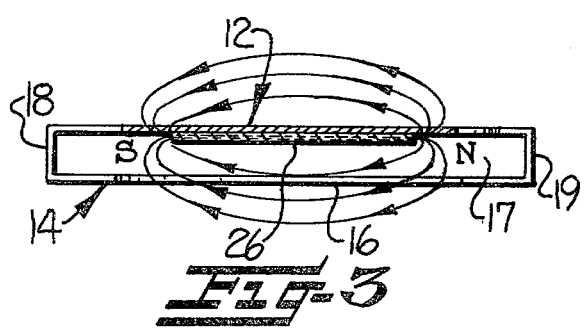
FIG. 3 is a sectional plan view taken substantially along the line 3—3 of FIG. 2.
Figure 4:
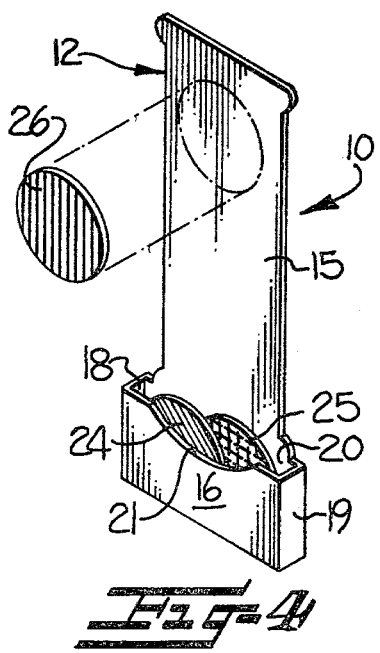
FIG. 4 is a perspective view of the aid and illustrating two of the indicator discs in their storage position.

The discs 24, 25, 26 are preferably fabricated from or include a magnetic material, whereby the discs may be individually and releasably secured at any location upon the display surface portion 15. Also, each disc has a diameter which comprises a substantial portion of the width of the display surface portion of the panel, and thus the three discs are able to be positioned in a longitudinally aligned and spaced apart relationship on the display surface portion as best seen in FIG. 2.

The aid 10 is sized so as to be readily used and transported by a teacher, and yet be readily visible throughout a classroom. As a typical example of its size, the aid may have an overall length of about 27 inches, a width of about 7½ inches, and the pocket may be about 10 inches wide, 4½ inches in height at the cut-out 21, and 1 inch deep. The discs may have a diameter of about 5 inches.

In use, the aid is disposed with its length dimension extending vertically and with the pocket 14 at the lower end of the panel 12. In this regard, the bottom end of the pocket will normally support the apparatus in an upright position in a flat desk, or alternatively, a suitable hook or the like (not shown) may be provided for hanging the apparatus on a wall as seen in FIG. 1.

In its vertical orientation, the aid will be seen to simulate a traffic light, and the three discs may be selectively positioned at three spaced locations along the length of the panel to simulate respectively the red, yellow and green lights of a conventional traffic light. As will be apparent, the aid may be used to instruct young students as to the meaning of each light, with the instructor first positioning the red disc at the upper location to simulate a red light, then placing the yellow disc at the central location to simulate the caution light, and then placing the green disc at the lower location to simulate a green light. Those discs which are not on the panel may be conveniently retained in a readily accessible location in the pocket 14. While in the pocket, the discs are substantially hidden from view by the sheet 16 of the pocket 14, and the cut-out 21 facilitates the gripping and removal of the discs when desired.

As a further aspect of the present invention, the apparatus 10 may be used for classroom control. For example, the teacher may instruct the students that the presence of the red disc signifies no talking, that the presence of the yellow disc is a warning that further talking will result in discipline, and that the presence of a green light signifies that talking is permitted. Thus the apparatus is able to function as a useful classroom control device, while reinforcing the meaning of the various signals of a conventional traffic light in the minds of the students.

In the drawings and specification, there has been set forth a preferred embodiment of the invention, and although specific terms are employed, they are used in a generic and descriptive sense only and not for purposes of limitation.

That which is claimed is:

1. An educational aid adapted to provide visual signals to students in a classroom for classroom control, educational purposes, or the like, and comprising
    a support panel including a generally rectangular flat display surface portion on one side thereof which has a length dimension substantially greater than its width,
    at least three circular discs of substantially equal size, each disc having faces respectively colored green, yellow, and red and a diameter which comprises a substantial portion of the width of said display surface portion,
    means associated with each of said discs and said panel for releasably securing individual ones of said discs upon said display surface portion,
    pocket means mounted to said panel for releasably retaining any of said discs not in use at a location other than upon said display surface portion,
    whereby the support panel may be disposed with the length dimension of the display surface portion extending vertically, and any one of said discs may be mounted at a selected location on said display surface portion to simulate a traffic light and give a desired signal to students or the like, and with the remaining discs being retained by said pocket means.

2. The educational aid as defined in claim 1 wherein said display surface portion has a length dimension sufficient to accommodate three of said discs positioned in a longitudinally aligned and spaced apart relationship thereupon.

3. The educational aid as defined in claim 2 wherein said pocket means is mounted on said one side of said panel and at one end of said display surface portion, and includes an opening sized to receive at least two of said discs in juxtaposed relationship.

4. The educational aid as defined in claim 3 wherein said securing means comprises magnetically attractable means associated with each of said discs and said display surface portion, whereby said discs are releasably held upon said display surface portion by magnetic attraction.

5. The educational aid as defined in claim 1 wherein said pocket means comprises a flat sheet secured in parallel, spaced relationship with respect to said panel, said sheet having a dimension in the length direction of said display surface portion which closely approaches the diameter of said discs, and whereby the discs are substantially hidden from view when disposed in said pocket means.

6. An educational aid configured to simulate a traffic light and adapted for classroom control, educational purposes, or the like, and comprising
    a generally rectangular flat support panel of ferrous metal material,
    pocket means mounted to overlie one end of said panel and such that the portion of said panel which extends beyond said pocket means defines a display surface portion which has a length equal to about three times its width, said pocket means including an opening extending across substantially the full width of said panel and facing said display surface portion,
    three circular discs of substantially equal diameter, with the diameter comprising a substantial portion of the width of said display surface portion, said discs including a magnetic material and having faces which are respectively colored green, yellow, and red, and
    whereby the apparatus may be disposed with the length dimension of said display surface portion extending vertically and with the pocket means at the lower end thereof, and any one of said discs may be mounted at any one of said spaced locations upon said display surface portion by magnetic attraction to simulate a traffic light and thereby give a desired signal to students or the like, and with the remaining discs being retained in said pocket means.

* * * * *